US008860831B1

(12) United States Patent
Burton et al.

(10) Patent No.: US 8,860,831 B1
(45) Date of Patent: Oct. 14, 2014

(54) BRIGHTNESS TRACKING LIGHT SENSOR

(71) Applicant: Exelis, Inc., McLean (VA)

(72) Inventors: Thomas Douglas Burton, Christiansburg, VA (US); James Hoge Bowen, Salem, VA (US); Kevin Patrick Hines, Daleville, VA (US)

(73) Assignee: Exelis, Inc., McLean, VA (US)

( * ) Notice: Subject to any disclaimer, the term of this patent is extended or adjusted under 35 U.S.C. 154(b) by 71 days.

(21) Appl. No.: 13/772,689

(22) Filed: Feb. 21, 2013

(51) Int. Cl.
*H04N 5/225* (2006.01)
*H04N 5/228* (2006.01)
*H04N 5/235* (2006.01)
*G02B 23/00* (2006.01)
*G02B 27/14* (2006.01)
*G09G 5/00* (2006.01)

(52) U.S. Cl.
CPC ..................... *H04N 5/235* (2013.01)
USPC .................. 348/217.1; 348/216.1; 348/222.1; 348/229.1; 359/629; 359/431; 345/7

(58) Field of Classification Search
CPC ........... G02B 2027/0118; H04N 5/332; H04N 5/2253; H04N 5/2258
USPC .......... 348/222.1–229.1, 216.1, 217.1; 345/7; 359/629, 431
See application file for complete search history.

(56) References Cited

U.S. PATENT DOCUMENTS

| | | | | |
|---|---|---|---|---|
| 5,589,880 A * | 12/1996 | Tsukui | .................. | 348/229.1 |
| 6,574,030 B1 * | 6/2003 | Mosier | .................. | 359/267 |
| 6,693,749 B2 * | 2/2004 | King et al. | .................. | 359/630 |
| 6,762,884 B2 * | 7/2004 | Beystrum et al. | .................. | 359/629 |
| 6,836,288 B1 * | 12/2004 | Lewis | .................. | 348/229.1 |
| 7,171,776 B2 * | 2/2007 | Staley, III | .................. | 42/142 |
| 7,697,750 B2 * | 4/2010 | Simmons | .................. | 382/154 |
| 7,706,064 B2 * | 4/2010 | Drodofsky et al. | .................. | 359/431 |
| 7,864,432 B2 * | 1/2011 | Ottney | .................. | 359/634 |
| 7,978,415 B2 * | 7/2011 | Schoenenberger et al. | ... | 359/630 |
| 8,044,776 B2 * | 10/2011 | Schofield et al. | .................. | 340/425.5 |
| 2002/0101664 A1 * | 8/2002 | King et al. | .................. | 359/629 |
| 2004/0042086 A1 * | 3/2004 | Beystrum et al. | .................. | 359/629 |
| 2007/0273968 A1 * | 11/2007 | Drodofsky et al. | .................. | 359/482 |
| 2009/0303315 A1 * | 12/2009 | Charlesworth | .................. | 348/61 |
| 2010/0283921 A1 * | 11/2010 | Li | .................. | 348/756 |
| 2012/0081673 A1 * | 4/2012 | Weinold et al. | .................. | 353/20 |
| 2012/0262615 A1 * | 10/2012 | Gaber | .................. | 348/311 |

* cited by examiner

*Primary Examiner* — Chia-Wei A Chen
(74) *Attorney, Agent, or Firm* — Ratnerprestia

(57) ABSTRACT

A brightness tracking system for an optical device includes a first imager for viewing a target of interest, a second imager for viewing the same target of interest, and a photodiode circuit. The photodiode circuit (a) measures brightness levels of the target of interest received from the first imager, and (b) controls output brightness of the second imager, based on the measured brightness levels received from the first imager.

17 Claims, 3 Drawing Sheets

BRIGHTNESS TRACKING LIGHT SENSOR

FIELD OF THE INVENTION

The present invention is related to optical devices that combine images taken by multiple cameras for simultaneous viewing by a user. More particularly, the present invention is related to an optical system that combines two images of a scene, in which the brightness of the scene is measured by one imager and then used to control the brightness output of the other imager.

BACKGROUND OF THE INVENTION

As an example, optical devices are commonly used by military or law enforcement personnel for conducting operations in low light or night conditions. Optical devices may include one or more image sources for providing an enhanced image to the user. Such an enhanced image may be provided by a fused optical goggle system.

Brightness tracking is an important feature of a fused optical system. By monitoring the brightness of the scene content of an image intensification ($I^2$) tube, for example, by means of an output voltage proportional to the screen current, the brightness of an optically-fused display may be automatically adjusted so as to match the image intensification tube output. The brightness tracking is important to the performance of the optically-fused goggle, because it prevents either the display or the $I^2$ tube from overwhelming the eye of the viewer. Not all image intensification tubes, however, provide an electrical signal output that is proportional to the scene content brightness of the tube.

There exists a need, therefore, to capture an entire scene content of an image and provide a direct measurement of the brightness of the image; and use the brightness of the image to provide a means for controlling the brightness of another image viewing the same scene content. There is also a need to measure brightness of an image without adding a built-in proportional electrical output (such as a screen current monitor) that measures such brightness.

SUMMARY OF THE INVENTION

To meet this and other needs, and in view of its purposes, the present invention provides an optical device including a first imager for viewing a target of interest and providing a first image to a viewer, and a second imager for viewing the target of interest and providing an output signal. A display is included for receiving the output signal and providing a second image to the viewer. A beam splitter is positioned to receive the first and second images and transmit the first and second images to the viewer. A photodiode circuit is positioned adjacent the beam splitter for measuring brightness levels of the first output image, and providing the brightness levels to the second imager. The second imager receives the brightness levels and, in response, controls the intensity levels of the second image.

The beam splitter is positioned perpendicular to a line-of-sight of the viewer, and includes either a prism or a waveguide optic. A condenser lens may be positioned between the beam splitter and the photodiode circuit for directing light received by the beam splitter toward the photodiode circuit. A band pass filter may be positioned between the beam splitter and the photodiode circuit for reducing light received from the second image.

A blanking circuit may be included to provide a trigger for starting a blanking interval on the display so that the photodiode circuit can receive the trigger and start measuring the brightness levels of the first output image. The photodiode circuit is configured to measure the brightness levels of the first output image in synchronism to the blanking interval on the display.

The first imager may include an image intensification tube for a night vision goggle system, or a camera operating at visible wavelengths. The second imager may include a thermal camera operating at infrared wavelengths.

Another embodiment of the present invention is a brightness tracking system comprising: a first imager for viewing a target of interest, a second imager for viewing the target of interest, and a circuit. The circuit measures brightness levels of the target of interest received from the first imager, and controls output brightness of the second imager, based on the measured brightness levels received from the first imager.

A beam splitter may be included for (a) directing light from the first and second imagers toward a viewer, and (b) directing light from the first and second imagers toward the circuit. The circuit is configured to measure the brightness levels of the target of interest, and controls] output brightness of the second imager. The circuit may include a photodiode for measuring the brightness levels of the target of interest.

A notch filter may be positioned between the display and the viewer for attenuating the output brightness of the second imager.

Yet another embodiment of the present invention is a brightness tracking system comprising:
  a first imager for viewing a target of interest,
  a second imager for viewing the target of interest, and
  a circuit for
    (a) measuring brightness levels of the target of interest received from the first imager, and
    (b) controlling output brightness of the second imager, based on the measured brightness levels received from the first imager;
  a beam splitter for
    (a) directing light from the first and second imagers toward a viewer, and
    (b) directing light from the first and second imagers toward the circuit.

The circuit is configured to measure the brightness levels of the target of interest. The second imager includes a display which directs the light from the target of interest toward the viewer, and the circuit controls the output brightness of the display.

The second imager may include
  (a) a display driver for providing an image of the target of interest on a display, and
  (b) a blanking trigger for blanking the display during an interval period, and
  the circuit is configured to measure the brightness levels of the target of interest in synchronism with the blanking trigger.

It is understood that the foregoing general description and the following is detailed description are exemplary, but are not restrictive, of the invention.

BRIEF DESCRIPTION OF THE FIGURES

The invention may be best understood from the following detailed description when read in connection with the accompanying figures. It is emphasized that, according to common practice, the various features of the figures are not to scale. On the contrary, the dimensions of the various features may be arbitrarily expanded or reduced for clarity.

DETAILED DESCRIPTION OF THE INVENTION

The exemplary systems disclosed herein are suitable for providing indicators to a user of an optical device. These optical devices for use with the present invention may be monocular or binocular. Suitable optical devices may be mounted to a helmet worn by a user. Alternatively, suitable optical devices may include handheld devices, or may include weapon-mounted devices.

The exemplary systems disclosed herein may be particularly suitable for use with optical devices having at least two image sources (e.g., fused imaging systems). For example, one image source may comprise an image intensifier tube that converts visible and near infrared light into viewable images. The intensifier tube amplifies a low light level image and presents an amplified image on its output surface. Additionally or alternatively, one image source may comprise a thermal imaging camera or detector to detect infrared radiation. Thermal imaging cameras are responsive to different portions of the infrared spectrum and are often referred to as infrared cameras, thus providing information to the viewer outside of the visible light range. In an exemplary embodiment, an optical device combines images from an image intensifier tube and from an infrared camera to provide an enhanced image to the user. Other suitable visual indicators will be understood by one of ordinary skill in the art from the description herein.

Figure 1:
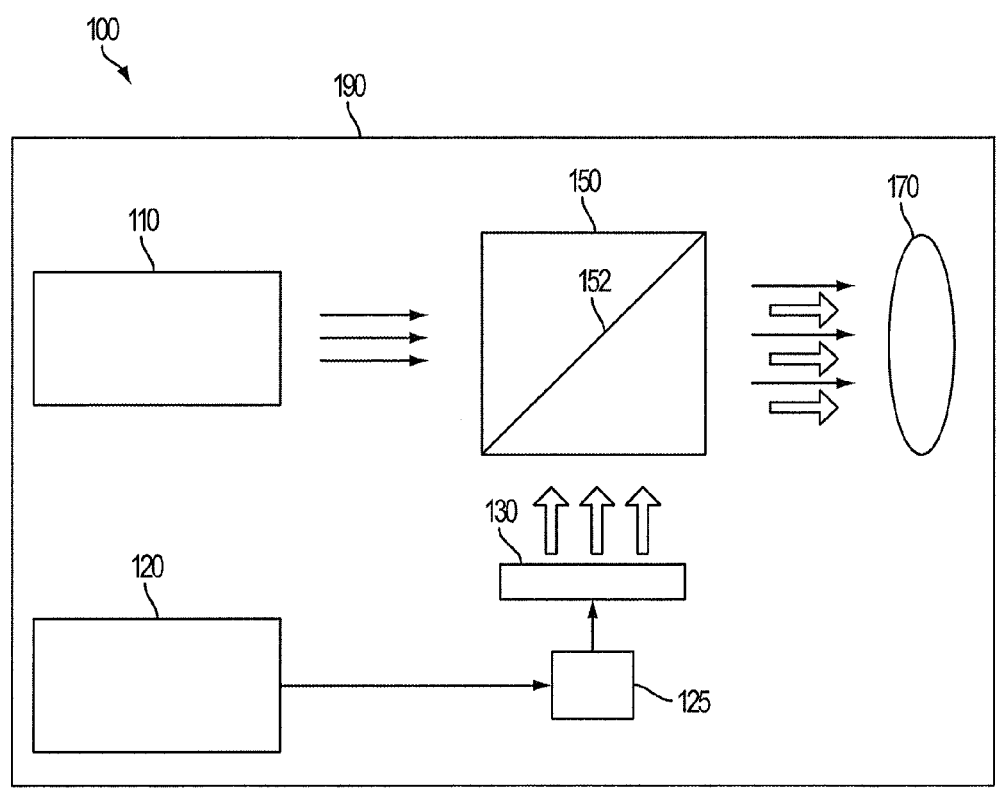
FIG. 1 is a block diagram of an exemplary optical device that includes two imagers having their respective outputs combined by a display beam combiner assembly (DBCA)/ prism, in accordance with aspects of the present invention.

Referring now to the figures, FIG. 1 illustrates an exemplary optical device 100 in accordance with aspects of the present invention. As an overview, optical device 100 generally includes a first image source 110, a second image source 120, a microdisplay 130, a beam combiner 150, and a user optical output 170. The optical device 100 may further comprise a housing 190 for housing the above elements.

First image source 110 generates a first image and transmits the first image to beam combiner 150. In an exemplary embodiment, first image source 110 is an image intensifier (I$^2$) tube. The image intensifier tube may include optical components such as an objective lens assembly configured to focus visible and near infrared light from a field of view of the optical device 100 onto the image intensifier tube. The image intensifier tube includes a photo-cathode that converts the light photons to electrons, a multi-channel plate that accelerates and multiplies the electrons, and a phosphor screen that receives the accelerated electrons and creates a luminance in response to the accelerated electrons. As indicated by arrows in FIG. 1, the image formed by the first image source 110 is transmitted toward beam combiner 150.

Second image source 120 generates a second image and transmits the second image by way of a microdisplay 130 to beam combiner 150. In an exemplary embodiment, second image source 120 is a long wave infrared (LWIR) or a short-wave infrared (SWIR) camera in communication with microdisplay 130. An infrared camera may incorporate optical components such as an objective lens configured to focus infrared radiation from the field of view of the optical device 100 onto a thermal sensor. The thermal sensor outputs a signal corresponding to the infrared image, and transmits the signal to an electronics system 125 for the infrared camera. The electronics system 125 processes the output signal from the thermal sensor and sends a processed signal to microdisplay 130. The microdisplay converts the signal into an image for viewing.

As indicated by arrows in FIG. 1, the infrared camera display transmits the image toward beam combiner 150. Suitable display types for use as microdisplay 130 include emissive type displays, reflective type displays, and/or transmissive type displays. Suitable emissive displays include electroluminescent displays, vacuum fluorescent displays, field emissive displays and OLEDS (organic LED's).

First and second image sources 110 and 120 may desirably generate images corresponding to the same field of view, to combine or fuse the information from both image sources 110 and 120 in a single image for transmission to the user. Thus, it may be desirable for the optical components of first and second image sources 110 and 120 to face in the same direction, and/or be aligned generally parallel to each other in optical device 100. However, as illustrated in FIG. 1, first and second image sources 110 and 120 may transmit their respective first and second images to beam combiner 150 at a substantially right angle relative to each other, where second image source 120 transmits the second image via microdisplay 130.

While first and second image sources 110 and 120 are described herein as an image intensifier tube and infrared camera, respectively, it will be understood that other image sources may be substituted. Additionally, while the above display has been described in conjunction with an infrared camera, it will be understood that other components may be employed to provide an image on the display. Other suitable image sources for use with the present invention will be understood by one of ordinary skill in the art from the description herein.

Beam combiner 150 receives the first and second images from first and is second image sources 110 and 120. Beam combiner 150 further generates a combined image from the first and second images, and transmits the combined image to a user of optical device 100, as indicated by the combined sets of arrows in FIG. 1. In an exemplary embodiment, beam combiner 150 includes an interface 152 for combining the images from first and second image sources 110 and 120. Beam combiner 150 may be approximately cylindrical in shape, including an axial surface and a radial surface. In this configuration, beam combiner 150 receives the first image through an axial surface of the beam combiner 150, and receives the second image through a radial surface of the beam combiner 150. Beam combiner 150 may be configured to transmit the combined image through another axial surface of the beam combiner 150. Beam combiner 150 may comprise, for example, one or more prisms for reflecting, refracting, or transmitting the images from first and second image sources 110 and 120.

Interface 152 in beam combiner 150 may extend at approximately a 45 degree angle relative to the direction of transmission of the first and second images, as illustrated in FIG. 1. Interface 152 may be configured to reflect, refract, or transmit the light from first and second image sources 110 and 120. For example, interface 152 may be configured to transmit a substantial portion of the first image through beam combiner 150 without refraction or reflection. Interface 152 may further be configured to reflect a substantial portion of the second image at a 90° angle, such that the reflected portion of the second image passes through beam combiner 150 in substantially the same direction as the first image, as illustrated in FIG. 1. Thus, both the first and second images may be combined by interface 152 for transmission through the rear axial surface of beam combiner 150 to the user. Interface 152 may be carefully selected to determine the relative portions of the first and second image transmitted and reflected, respectively. Interface 152 may comprise, for example, a dichroic filter, or a boundary between two prisms.

User output 170 receives the combined image from beam combiner 150 and transmits the combined image to a user. In an exemplary embodiment, user output 170 comprises one or more optical elements. Suitable optical elements include, for example, visual or eyepiece lenses. The user output is configured to focus the combined image from beam combiner 150 and transmit the focused image to the user's eye. Thus, optical device 100 is operable to receive an image from multiple image sources, combine the image, and present the combined image to a user in order to provide the user with enhanced vision in low light or night conditions.

Figure 2:
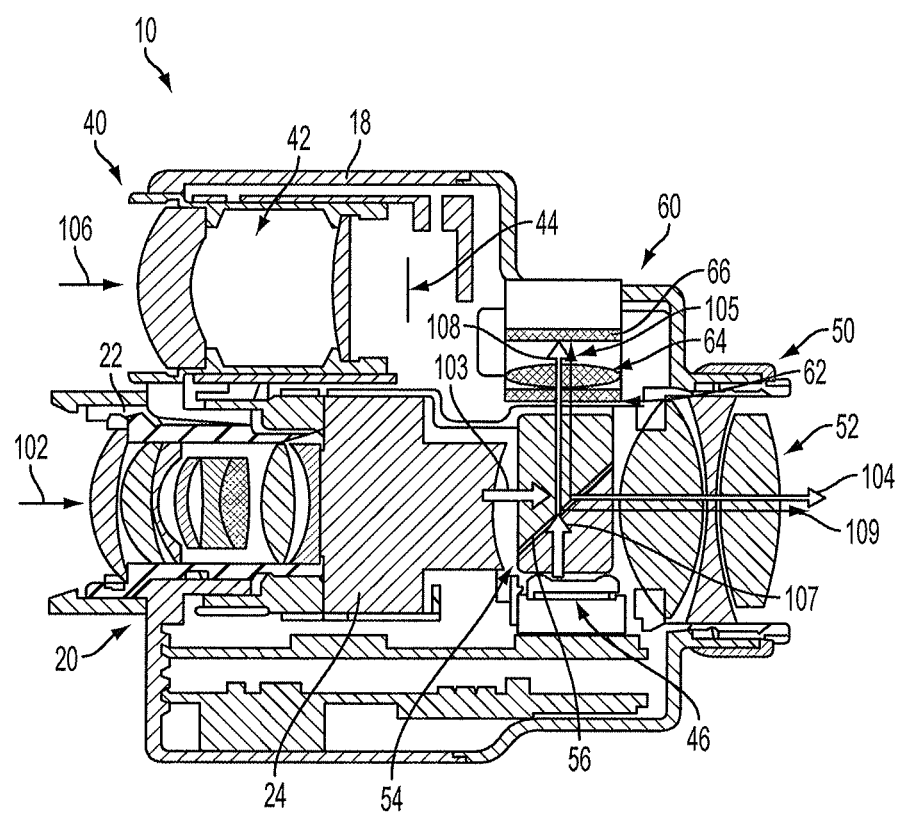
FIG. 2 is an cross sectional view of an optical device, for example, an optical goggle system that includes a first imager with an image intensifier tube providing a first image and a second imager having a second image outputted to a display, and a DBCA/prism that combines both images and provides the combined image to a viewer.

An example of an optical device having two combined images is shown in FIG. 2. The optical device 10 generally includes an image intensifier 20, a second channel sensor, such as an infrared camera 40, a user output 50 and a camera assembly 60. These devices are retained within a housing 18. While a single housing 18 is shown, one or more of the components may be provided as stand-alone components that are attached to, or otherwise associated with housing 18. The camera assembly 60 may be a stand-alone camera that can be attached as needed and stored when unnecessary, thereby reducing weight of the optical system. A plug or cover (not shown) may be positioned over the camera assembly's port when not in use.

The image intensifier 20 includes an objective lens assembly 22 configured to focus visible and near infrared light from a sensed image 102 onto an image intensifier tube 24. The image intensifier tube 24, also referred to as an $I^2$ tube includes a photo-cathode that converts the light photons to electrons, a multi-channel plate that accelerates the electrons and a phosphor screen that receives the accelerated electrons and creates a luminance in response to the accelerated electrons. The image created by image intensifier 20 is directed along an image intensified input path, as indicated by arrow 103, to a beam splitter 54. The beam splitter 54 may combine and/or split received beams, as will be described in more detail hereinafter, but is referred to herein as a beam splitter. The user display optics 52 are substantially co-axial with the image intensifier 20 and the beam splitter 54, but instead may be offset with a non-linear optics path defined there-between.

While the second channel sensor may be any suitable sensor, for purposes of the present disclosure, the second channel sensor will be described as an infrared camera 40. The infrared camera 40 is used to convert infrared imagery into a visible image. The infrared camera 40 may be based on an uncooled focal plane array (FPA) and incorporates its own objective lens 42, which is designed to provide a thermal video field of view that is essentially the same as the field of view of the image intensifier 20. The optical axes of infrared camera 40 and image intensifier 20 are aligned generally parallel to each other. The objective lens 42 focuses the infrared image 106 on to the thermal sensor 44, which outputs a signal indicative of the image. A system electronics module processes the output signal from the thermal sensor 44, which is then sent to display 46 and converted into an image for viewing. The display 46 is configured to provide an infrared image along a camera output path 107 to the beam splitter 54 at a substantially right angle relative to the path of the image intensifier image 103.

The display 46 may have various configurations, for example, an emissive type, reflective type, or transmissive type. An emissive type is preferred for the present application since it offers the smallest package and consumes the least power, although reflective and transmissive type displays are encompassed herein. Emissive displays include electroluminescent displays, vacuum fluorescent displays, field emissive displays and OLEDS (organic LED's). As the name implies, the emissive source emits light and does not require a separate light source.

The beam splitter 54 includes a dichroic surface 56 that is configured to control passage of the image intensifier image 103 and the infrared camera video image along the camera output path 107 through the beam splitter 54. The dichroic surface 56 allows a predetermined percentage of light incident thereon to pass through while reflecting the remainder of the light. For example, the dichroic surface 56 may be configured to allow approximately 70-90 percent of the light incident thereon to pass through while the remaining 10-30 percent is reflected. The percentage of pass through may be varied and is not limited to the indicated range.

In the present embodiment of the invention, the dichroic surface 56 is configured to allow a percentage of the light incident thereon to pass through. By way of example only, 85 percent of the incident thereon may pass through. As such, approximately 85 percent of the image intensifier image 103 passes through the beam splitter 54 toward the user display optics 52, along a visual lens output path, as indicated by arrow 104, while a remaining percentage, in this case, approximately 15 percent, is reflected. With the dichroic surface 56 at an approximately 45 degree angle, the reflected portion of the image 105 is directed upward in the figures, parallel to the path of the camera output path 107. Similarly, a percentage of the video display image along the camera output path 107 passes through the dichroic surface 56, as indicated by arrow 108, and combines and travels with the intensifier image reflected portion 105. Again, by way of example only, this percentage may be 85 percent of the video display image. The remaining percentage, in this case, approximately 15 percent, of the video display image along the camera output path 107 reflects off the dichroic surface 56, as indicated by the arrow 109, and combines with the passed through portion 104 of the intensifier image. Mathematically, the percentage of light incident on the dichroic surface 56 that passes through the dichroic surface 56 may be "x" percent, while a remaining percentage, "(100-x)" percent, is reflected. The percentage of the video display image along the camera output path 107 that passes through the dichroic surface 56 is also "x" percent, while a remaining percentage, "(100-x)" percent, is reflected.

The combined images 104 and 109 are directed along a visual lens output path toward the user display optics 52. The user display optics 52 provide the user with the ability to focus on the beam splitter 54 such that the combined image is provided to the user's eye.

The reflected portion 105 of the intensifier image and the passed through portion 108 of the video display image travel along a camera output path toward a photodiode circuit assembly 60. The photodiode circuit assembly 60 generally comprises a filter 62, a condenser 64, and a photodiode circuit 66. The photodiode circuit 66 senses all or part of the image portions 105 and 108, depending on the filter 62, and creates a signal that contains a rendition of the sensed image portions 105 and/or 108.

The filter 62 may be an absorbing filter that reduces, but does not eliminate, the sensed image portion 108, such that a combined image is provided to photodiode circuit 66. To capture only the intensifier image portion 105, the filter 62 may be a band pass filter to eliminate the video display image portion 108, thereby only passing the intensifier image portion 105 to the photodiode circuit 66.

Figure 3:
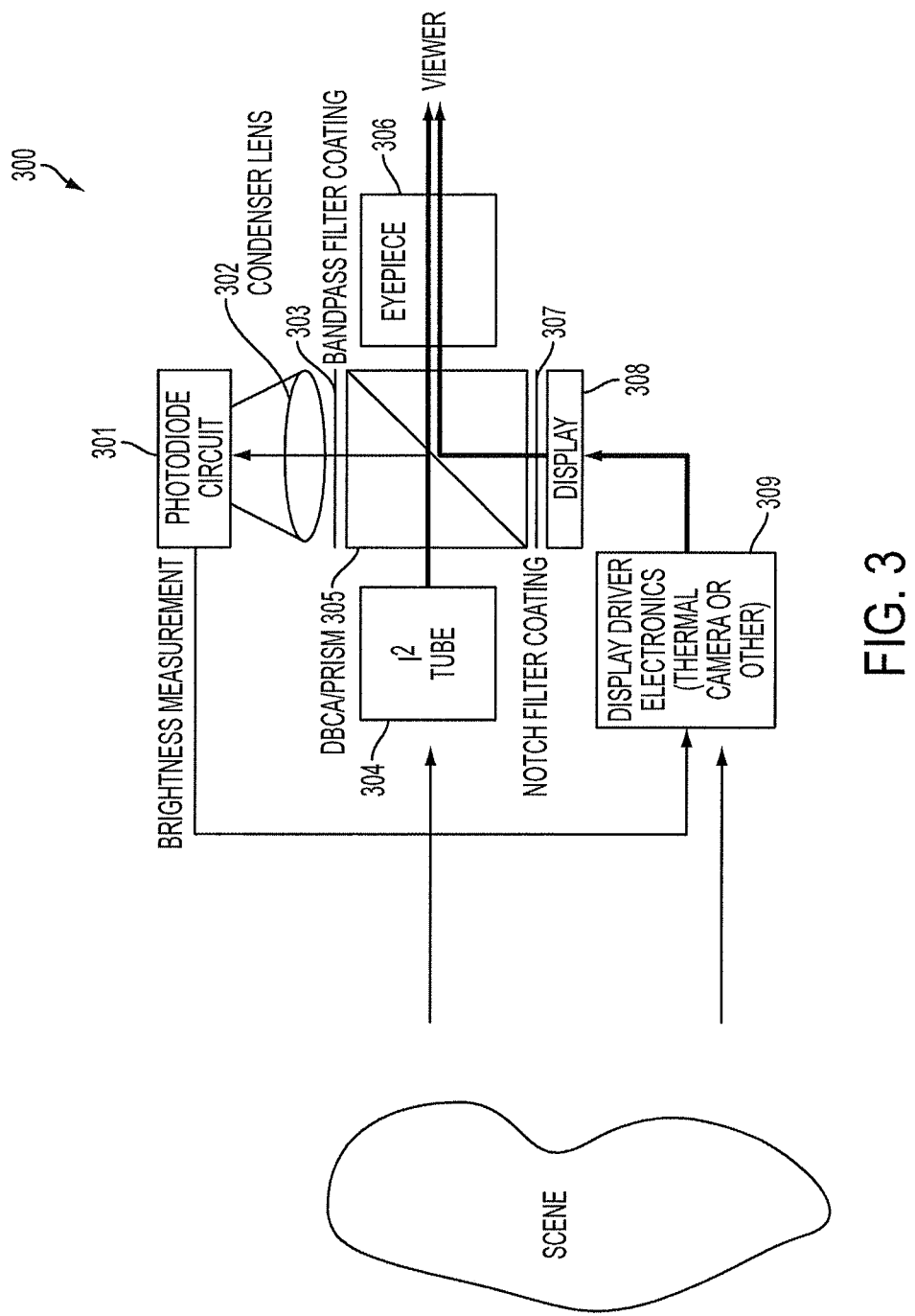
FIG. 3 is block diagram of an optical system including first and second imagers that are combined by a DBCA/prism and a brightness measurement circuit that controls the brightness of one of the image outputs to the viewer, in accordance with an embodiment of the present invention.

Having described FIGS. 1 and 2, reference is now made to FIG. 3, depicting an optical device 300, in accordance with an embodiment of the present invention. As shown, a first imager includes an image intensifier tube 304 for viewing a target of interest and providing a first image to a viewer. The first image passes through a DBCA/prism 305 and an eyepiece 306 before reaching the viewer. A second imager, such as a thermal camera, generally designated as 309, includes display driver electronics for providing a second image on display 308. As explained with respect to FIGS. 1 and 2, the DBCA/prism 305 combines both images and sends the is combined images, by way of eyepiece 306, to the viewer.

A photodiode circuit 301 is positioned above the beam combiner prism so as to capture a portion of the output of the $I^2$ tube 304, as well as a portion of the display output 308. A condenser lens 302 may be used, if necessary, to direct most of the light output from the $I^2$ tube onto the active area of the photodiode circuit 301. By placing the condenser lens and the photodiode on the top surface of the DBCA/prism 305, the present invention removes these components from direct line of sight of the $I^2$ tube and allows the entire image brightness to be measured. This is much more effective, as the present invention still produces the brightness of the entire image rather than a small portion that may be measured in an out-of-the-way corner of the imaging optics.

A band pass filter coating may be placed, as shown, on the top surface of the prism, or at the input of the photodiode, to allow a specific color wavelength of the $I^2$ tube output to pass into the photodiode circuit 301, while filtering out a majority of the display 307 output wavelengths. The resulting electrical output of the photodiode circuit is then proportional to the brightness of the $I^2$ tube scene content and is not affected by the display brightness. A notch filter coating 307 may also be placed on the DBCA/prism between the display and the prism, as shown, to provide additional attenuation at a specific wavelength(s).

It will be appreciated that if the display output is still leaking through and affecting brightness tracking, the present invention may "blank" the display briefly and measure the $I^2$ tube brightness only during this blanking interval. Alternatively, the display blanking may be used by the present invention without any necessity for the optical filters.

It will also be appreciated that a transimpedance amplifier may be used to convert the photodiode current into a voltage. The photodiode current may also be scaled, so that it may be readable by an analog-to-digital converter elsewhere in the optical system; this scaled voltage may then be used to control the brightness of the image on the display.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. An optical device comprising:
   a first imager for viewing a target of interest and providing a first output image to a viewer,
   a second imager for viewing the target of interest and providing an output signal,
   a display for receiving the output signal and providing a second image to the viewer,
   a beam splitter positioned to receive the first and second images and transmit the first and second images to the viewer, and
   a photodiode circuit positioned adjacent the beam splitter for measuring brightness levels of the first output image, and providing the brightness levels to the second imager,
   a blanking circuit providing a trigger for starting a blanking interval on the display,
   wherein the photodiode circuit is configured to receive the trigger and start measuring the brightness levels of the first output image in synchronism to the blanking interval on the display,
   wherein the second imager receives the brightness levels and, in response, controls intensity levels of the second image.

2. The optical device of claim 1 wherein
   the beam splitter is positioned perpendicular to a line-of-sight of the viewer.

3. The optical device of claim 1 wherein
   the beam splitter includes one of a prism and a waveguide optic.

4. The optical device of claim 1 including:
   a condenser lens positioned between the beam splitter and the photodiode circuit for directing light received by the beam splitter toward the photodiode circuit.

5. The optical device of claim 1 including:
   a band pass filter positioned between the beam splitter and the photodiode circuit for reducing light received from the second image.

6. The optical device of claim 1 wherein
   the first imager includes an image intensification tube for a night vision goggle system.

7. The optical device of claim 1 wherein
   the first imager includes a camera operating at visible wavelengths.

8. The optical device of claim 1 wherein the second imager includes a thermal camera operating at infrared wavelengths.

9. A brightness tracking system comprising:
   a first imager for viewing a target of interest,
   a second imager for viewing the target of interest, and
   a circuit for
   (a) measuring brightness levels of the target of interest received from the first imager, and
   (b) controlling output brightness of the second imager, based on the measured brightness levels received from the first imager, and
   wherein the second imager includes
   (a) a display driver for providing an image of the target of interest on a display, and
   (b) a blanking trigger for blanking the display during an interval period, and
   the circuit is configured to measure the brightness levels of the target of interest in synchronism with the blanking trigger.

10. The brightness tracking system of claim 9 including a beam splitter for
    (a) directing light from the first and second imagers toward a viewer, and
    (b) directing light from the first and second imagers toward the circuit,
    wherein the circuit is configured to measure the brightness levels of the target of interest received from the first imager.

11. The brightness tracking system of claim 10 including
a condenser lens positioned between the beam splitter and the circuit for directing light from the beam splitter toward the circuit.

12. The brightness tracking system of claim 10 including
a band pass filter positioned between the beam splitter and the circuit for reducing light from the second imager directed toward the circuit.

13. The brightness tracking system of claim 9 wherein
the second imager includes a display which directs the light from the target of interest toward the viewer, and
the circuit controls output brightness of the display.

14. The brightness tracking system of claim 13 including
a notch filter positioned between the display and the viewer for attenuating the output brightness of the second imager.

15. The brightness tracking system of claim 9 wherein
the first imager includes an image intensification tube, and the second imager includes a thermal camera.

16. The brightness tracking system of claim 9 wherein
the circuit includes a photodiode for measuring the brightness levels of the target of interest.

17. A brightness tracking system comprising:
a first imager for viewing a target of interest,
a second imager for viewing the target of interest, and
a circuit for
(a) measuring brightness levels of the target of interest received from the first imager, and
(b) controlling output brightness of the second imager, based on the measured brightness levels received from the first imager;
a beam splitter for
(a) directing light from the first and second imagers toward a viewer, and
(b) directing light from the first and second imagers toward the circuit,
wherein the circuit is configured to measure the brightness levels of the target of interest received from the first imager;
the second imager includes a display which directs the light from the target of interest toward the viewer, and
the circuit controls output brightness of the display;
the second imager includes
(a) a display driver for providing an image of the target of interest on a display, and
(b) a blanking trigger for blanking the display during an interval period, and
the circuit is configured to measure the brightness levels of the target of interest in synchronism with the blanking trigger.

* * * * *